Aug. 2, 1955  A. CROFT ET AL  2,714,458
DEVICES FOR FEEDING GRANULAR AND OTHER SIMILAR MATERIALS
Filed March 27, 1952  2 Sheets-Sheet 1
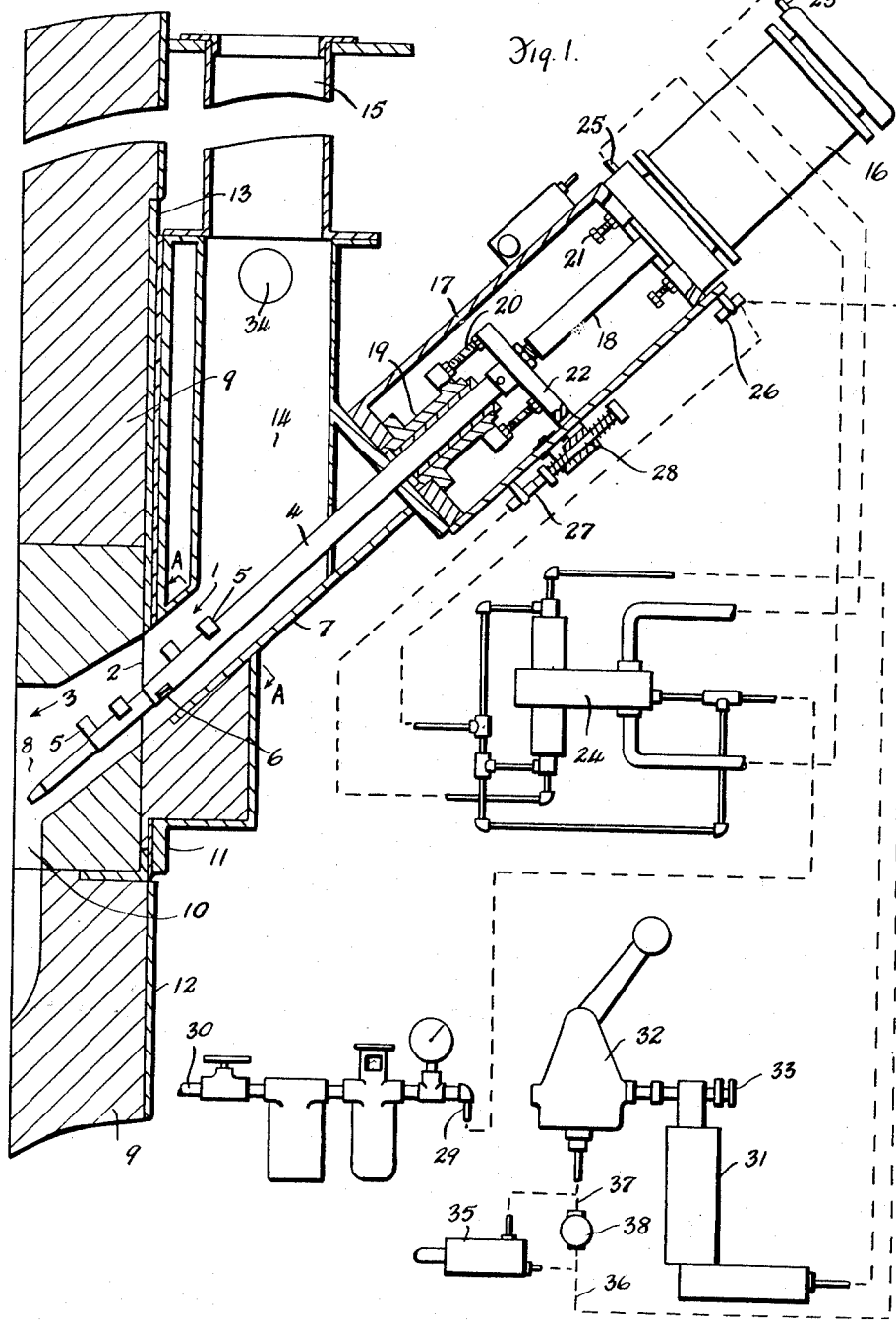

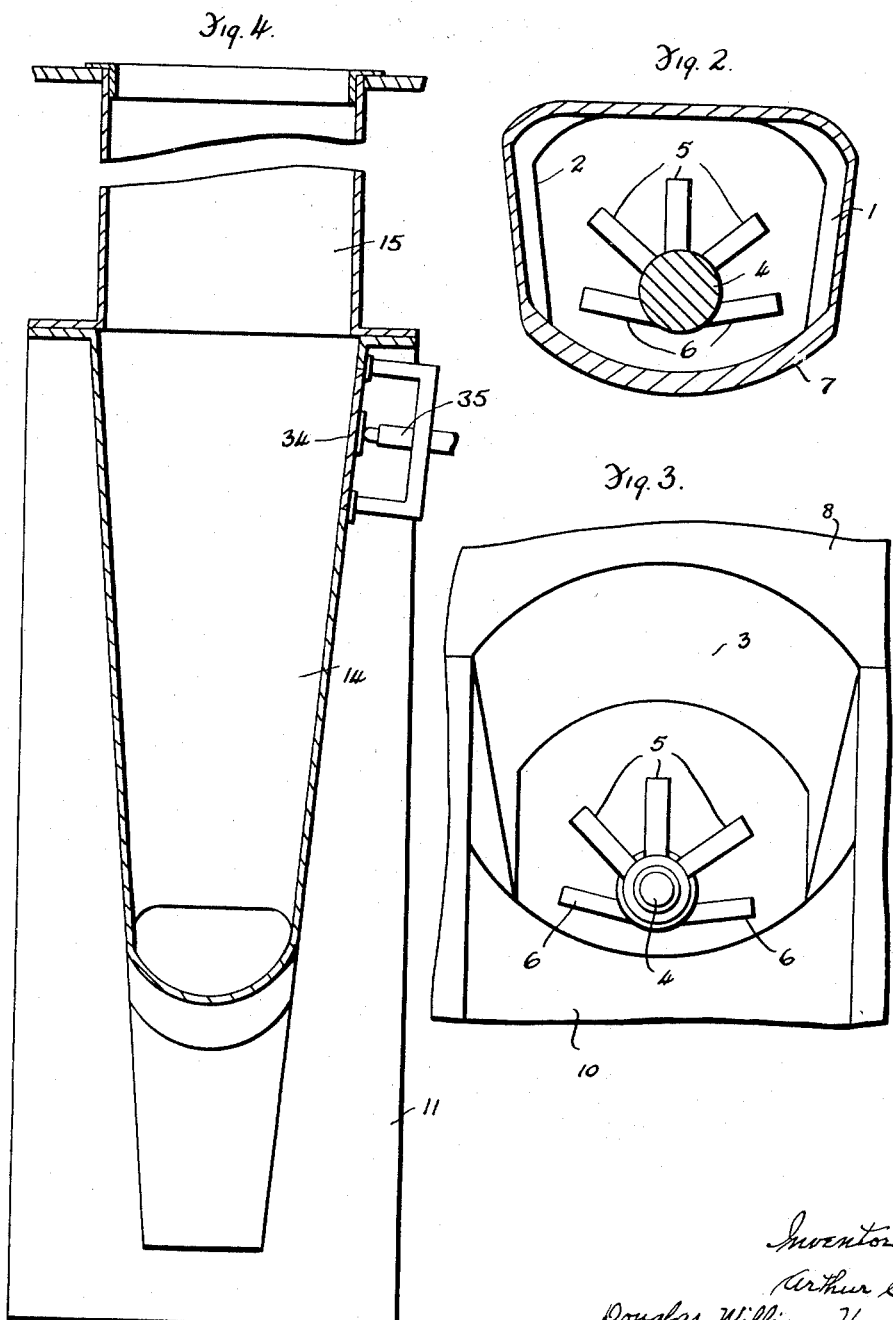

2,714,458

DEVICES FOR FEEDING GRANULAR AND OTHER SIMILAR MATERIALS

Arthur Croft, Douglas William Hammond, and Maurice Thomas James Goff, Thornbury, Bradford, England, assignors to Crofts (Engineers) Limited, Thornbury, Bradford, England Application March 27, 1952, Serial No. 278,762

Claims priority, application Great Britain February 25, 1952

7 Claims. (Cl. 214—23)

This invention relates to devices for feeding granular and similar materials such as metallic powder, borings, swarf or pulverised or loose material, to a receiving source from hoppers, conveyors, chutes, chambers and similar sources, and especially to the feeding of metal swarf to cupola furnaces. The term metal swarf is intended to include borings, turnings, grindings or other metal from machining operations and the like. For convenience all the above materials are generally hereafter referred to as "granular materials."

Various devices have been constructed for feeding materials of this type to a receiving source, but often these tend to move the material in such a manner that it is not fully under control. Moreover, the devices for feeding are often complicated or cumbersome and a common method of feeding is to employ a conveyor or endless chain device or chain grate, which latter method is relatively common in the fire bed of furnaces.

The main object of this invention is to provide an improved relatively simple but efficient feeding device which affords control of the material being fed and furthermore can be capable of feeding predetermined amounts and be controlled and work automatically in its feeding operations.

Another object of the invention is to provide a feeding device for granular material including a feed passage, means for leading granular material into the feed passage, said passage being constructed so that the material requires to be urged in the direction of feeding so as to be under control, a feed ram mounted to reciprocate in said passage to urge the material towards its outlet, and operating means for causing reciprocation of the feed ram for controlled feeding purposes.

Yet another object of the invention is to provide a feeding device for granular material including an inclined feed passage, said passage being constricted intermediate its length to control the gravitational feeding movement of the material through the passage, said passage being increased in size at least at its outlet for material to move relatively freely therefrom, a feed ram mounted to reciprocate in said passage to urge the material towards its outlet, means for causing reciprocation of the feed ram for controlled feeding purposes, said ram being of varying section to form at least one shoulder, projections at several points in the length of the ram to thrust on the material but be withdrawable therethrough on its return stroke, and an inlet for the admission of granular material into the feed passage from feed means.

The improved construction may include pneumatic electric or hydraulic operating means for reciprocating the feed ram and may be arranged so that should the movement of the feed ram be arrested by a resistant force, the feed ram movement can recommence automatically immediately the said force is lessened or removed. The improved feeding device can be associated with a cupola furnace for feeding metal swarf thereto in predetermined quantities, and can include a safety device for automatically arresting the movement of the mechanism should the level of the swarf in the feeding device fall to a predetermined point.

Referring now to the accompanying drawings, an embodiment of the invention is shown wherein:

Fig. 1 is a part sectional elevation through the complete feeding device and details of the control valves;

Fig. 2 is a cross sectional view on line A—A through the feed passage;

Fig. 3 is an end view of the feed ram and feed passage outlet; and

Fig. 4 is a part sectional vertical elevation of the feed chamber leading into the feed passage.

In the illustrated embodiment of the invention, an inclined feed passage 1 is designed for the passage of granular material such as metal swarf and this feed passage is constricted on its side walls, towards an intermediate point 2. From this point the feed passage flares (or is otherwise shaped) towards the outlet 3 from the feed passage, so that from the point of constriction there is a tendency for the material to move more freely. In this way material is retained against a free flowing action, so that it requires urging towards the outlet. Convenient means for urging the material comprises a feed ram 4 located in the feed passage a required distance above the base thereof, which is curved to facilitate movement of the material, and this feed ram can be of one, two or more diameters, and is shown to be of three diameters. If the diameter varies as shown, the smaller diameter is at the outer nose end of the feed ram so that a shoulder or shoulders is or are provided on the feed ram which will serve for urging material and the feed ram is also thus reduced in the region where the material tends to flow more freely. Further means to urge the material are provided in the form of projections 5, such as short bars or pins at intervals along the length of the feed ram and these are staggered radially so as to spread the thrust action about the axis of the feed ram. When pins are used, or even other projections, they can be removable for replacement purposes. It will readily be understood that other forms of projections may be employed if desired. To ensure movement of the material in the lower region of the feed passage the feed ram is furnished with scraper means 6 at one point and such a scraper comprises a bent, or straight, bar projecting laterally from the under side of the feed ram, although it may be otherwise shaped.

The feed passage illustrated is fabricated to be used in conjunction with a cupola furnace with the rear part 7 of the feed passage made as a metal (or other) structure, which may incorporate refractory or insulating material. The forward outlet end 8 of the passage is formed in a refractory or other block or structure in the lining wall 9 of the furnace. By providing such a block it is readily renewable, when repairing the cupola lining. This outlet terminates in an orifice 10 in the form of a recess in the wall of the furnace extending downwardly to provide an increased area from which the swarf or like material can move into the material being melted in the furnace, as more fully described in our co-pending United States patent application Serial Number 269,748, filed February 4, 1952. This feed passage is furnished with suitable means such as a flange plate 11 for securing it to the outer shell 12 of the furnace, or other structure, i. e. the adaptor plate 13 which is attached to the furnace.

Material is fed into the feed passage 1 from a vertical feed chamber 14 which receives material in any convenient manner and a suitable arrangement comprises an inlet chute 15 leading into the upper part of the chamber. The feed chamber 14 is shown tapering downwardly but need not necessarily do so. Material can enter the chute from a hopper (not shown) or another chute or other means and if desired a device can be incorporated for regulating the supply of material to the feed chute or regulating it in the chute itself or the feed chamber. It will be appreciated that there will be an internal pressure in the cupola, and hot gases will escape through any aperture in the furnace wall if precautions are not taken. The feeding device is so designed that the swarf which it contains when the apparatus is working, offers resistance to the flow of gases from the interior of the cupola. To ensure this resistance is always present when required, a control device (as hereinafter described) is incorporated in the feed chamber or chute, which automatically stops the mechanism of the apparatus, should the level of the swarf fall to a certain point.

This provision ensures the retention of a predetermined quantity of swarf in the feed passage and feed chamber and prevents the possibility of the full flow of hot gases from the interior of the cupola passing through the feed passage and chamber into the atmosphere and also causing damage to the apparatus.

The feed ram 4 requires to be reciprocated so that on its down stroke it urges the material in the feed passage towards the outlet and then is withdrawn through the material for a further feeding stroke. To accomplish this reciprocation a convenient arrangement is the provision of a piston and double acting cylinder 16 mounted on the housing 17 behind the feed passage and rear of the chamber, or other structure. This housing 17 encloses the projecting end of the cylinder ram 18 and the bearing 19 in which the rear end of the feed ram works. Adjustable stops 20, 21 are provided in the housing to limit the working stroke of the feed ram, and associated parts, through the medium of stop bar 22 secured at the juncture of the cylinder and feed ram. Such piston is pneumatically, but may be hydraulically, operated. The pneumatic arrangement is preferably such that the required air pressure is admitted into the cylinder 16 through air pipe 23 behind the piston through a control relay valve 24 and then by an air system and valves automatically the pressure is cut off and reverts to the other side of the piston through air pipe 25 to withdraw the feed ram and then continue in the required cycle of operations. This system is on known principles to suit the novel operation required for the feed ram and incorporates top and bottom tappet valves 26, 27 operated by the double spring loaded double headed pin 28 carried by the stop bar 22. Operation of the tappet valves automatically constantly reverses the airflow to the cylinder ends when the main valve 29 is opened to admit air from the supply line 30 to the relay valve 24. The top tappet valve 26 has a dual function in that it is connected to a dwell valve 31 which ensures a dwell at the end of the return stroke of the feed ram and the air feed through the dwell valve is controlled by a hand control valve 32 so that the feed ram can be arrested at the top of its stroke. This system incorporates a bleeder or equivalent valve 33 which is adjustable so that the feed ram can have a dwell on its return stroke for a desired period of time before it is again urged downwardly; for this particular arrangement it is preferable that the feed ram returns instantly without any appreciable dwell at the bottom of its stroke. This arrangement enables the periodicity of stroke to be controlled at will. Thus the feed ram returns quickly from the heated zone back into the cooler zone of the material to be fed, which reduces the possibility of the end of the feed ram and its projections being damaged by heat. By using operating means of this character, a predetermined air pressure can be admitted to the cylinder and thus, should a resistant force be built up at the outlet from the feed passage, due to the optimum amount of swarf which the charge in the furnace will receive at that time, the reciprocation will be arrested automatically so that the feed ram is at rest. The device will recommence operating automatically immediately the resistant force is removed or lessened. In this manner little attention is required for the device in operation as it will carry on feeding the required amount and automatically stop feeding during any period or periods when material cannot be accepted into the furnace.

The aforesaid control device for ensuring there is always a sufficient amount of material in the feeding device comprises a flexible diaphragm 34 mounted in the wall of the feed chamber 14 (it may be in the wall of the chute 15) to operate a tappet valve 35. When the pressure of material is sufficient the valve 35 is depressed to leave a clear air passage through the air pipe 36. Should the pressure decrease due to lack of sufficient material in the feeding device, the valve 35 closes automatically and thus stops the mechanism. In some circumstances, such as when emptying the feeding device with the furnace out of commission, it is necessary to cut out this automatic control. For this purpose the control is bypassed by pipe 37 with the manual control valve 38 opening the passage through the pipe 36. It will be appreciated some other form of control device may be substituted for the pressure diaphragm, such as some other form of pressure responsive device, a photo electric cell element or equivalent means.

A feeding device of the above type employed in conjunction with a cupola furnace for feeding metal swarf or other granular materials thereto, has the advantage that due to variation in the conditions occurring in a cupola, the amount of swarf which is introduced into the furnace alters according to the variation in the melting rate of the furnace, and any stoppage of the melting due to slagging or non-demand for metal. Under such conditions the feed of all swarf must stop due to the voids in the charge being completely filled and it being impossible to feed further materials. This cessation of feed automatically occurs as aforesaid with the apparatus described. Due to the design of the feeding device, if the resistance offered becomes greater than the thrust exerted by the piston, then the feed ram ceases to reciprocate until further movement of the charge in the furnace takes place when melting is resumed. Thereupon the feed ram automatically recommences to work and thus no overloading of the mechanism of the apparatus can take place. It will be appreciated that the position in which the inlet to the furnace is placed is such that the temperature is high enough to cause fusion of the swarf in the feed passage. It is important that this condition does not occur at any point in the feed passage 1, otherwise stoppage of the feed would occur. The design of the feed ram, feed passage and outlet is such that the scrapers and fingers are continually passing to and fro through the whole of the swarf in the feed passage and into relatively close proximity to the orifice in the furnace wall, thereby offsetting the tendency for fusion to take place.

It will be appreciated that whilst this feeding device is eminently suitable for feeding metal swarf or other material to a cupola furnace it can be adapted for feeding granular material into other furnaces or apparatus, or receiving sources, although it is designed more particularly for the purpose of feeding to cupola furnaces. Also it is preferred to feed at an inclination in the above stated manner and such an inclination may be calculated to suit requirements but it could feed in certain circumstances in a horizontal plane.

What we claim is:

1. A device for feeding granular material to a shaft furnace, including a feed passage inclined downwardly at an angle sufficient to assist gravity feed but insufficient to effect gravity feed of the granular material, said passage being constricted at an intermediate point to control the gravitational feeding movement of material through the passage, the lower outlet portion of such passage below the constriction flaring outwardly to allow a freer movement of material in said portion, a skeleton feed ram which only partially closes said passage mounted to reciprocate in said passage to urge the material towards said outlet and have a stirring action, said ram comprising a rod with lateral projections thereon, operating means for causing reciprocation of the feed ram, means for controlling the ram feeding action so that its rate of reciprocation varies inversely with the resistance thereto of the granular material in said passage, and an inlet for the admission of granular material into the feed passage through feed means.

2. A device for feeding granular material to a shaft furnace, including a downwardly inclined feed passage, said passage being tapered to a constriction intermediate its ends to control the gravitational feeding movement of the material through the passage, said passage being flared from the constriction towards its outlet to allow material to move relatively freely therefrom, a skeleton feed ram mounted to reciprocate in said passage to urge the material towards its outlet, fluid operating means for causing reciprocation of the feed ram for controlled feeding purposes, said ram comprising a rod with elements projecting laterally therefrom at different angles from several points in the length of the ram rod to thrust through the material for feeding purposes but be withdrawable therethrough on its return stroke to create a stirring action, means for controlling the ram feeding action so that it automatically reacts to a resistant force, and an inlet for the admission of granular material by gravity into the feed passage from feed means.

3. A feeding device according to claim 2, wherein the ram operating means are controlled to reciprocate the feed ram with no appreciable dwell at the end of its forward stroke and a substantial dwell at the end of its return stroke, and means for varying the period of said return dwell.

4. A feeding device according to claim 2, wherein the outlet from the feed passage is formed in a replaceable member of heat-resisting material fitted into the shaft furnace lining, said outlet flaring towards the interior of the furnace and opening into a downwardly-extending recess.

5. A feeding device according to claim 2 wherein the feed ram rod is reduced in size at least once towards its free outer end and provided with projecting elements at different angles and with laterally extending scraper means to act in the lower region of the feed passage.

6. A feeding device according to claim 2, wherein the valve control means for the ram operating means are associated with valve operating means adapted to automatically cut off the inlet of fluid to the ram cylinder when the supply of granular material to the feed passage is interrupted, and means for allowing the inlet of fluid to the ram operating means automatically immediately the said supply of granular material is restored.

7. A feeding device for fluent granular material to a shaft furnace comprising a passageway inclined downwardly at an angle sufficient to assist the gravity flow of the granular material but insufficient to effect gravity flow thereof, said passageway flaring outwardly at its discharge end, means for supplying granular material to said passageway, a skeleton ram mounted to reciprocate longitudinally in said passageway and only partially closing the same, said ram comprising a rod of smaller size than the cross section of said passageway and lateral projections thereon each occupying only a small fraction of the cross section of the passageway, means for reciprocating said ram, means for applying a limited motive force to said ram reciprocating means whereby the rate of reciprocation thereof varies automatically with the resistance to reciprocation created by the granular material in said passageway and means responsive to the supply of material to said passageway connected to automatically stop the supply of motive force when the supply of granular material is insufficient to maintain said passageway full and to restore the supply of motive force when the supply of said material is sufficient to maintain said passageway full.

References Cited in the file of this patent

UNITED STATES PATENTS

| | | |
|---|---|---|
| 931,536 | Weiland | Aug. 17, 1909 |
| 1,024,623 | Dougherty | Apr. 30, 1912 |
| 1,736,565 | Woodcock | Nov. 19, 1929 |
| 2,624,565 | Kompart | Jan. 6, 1953 |